(12) United States Patent
Kraft et al.

(10) Patent No.: US 8,608,192 B2
(45) Date of Patent: Dec. 17, 2013

(54) SIDE AIRBAG FOR A VEHICLE OCCUPANT RESTRAINT SYSTEM OF A MOTOR VEHICLE

(75) Inventors: Michael Kraft, Dornstadt (DE);
Manfred Schmid, Illertissen (DE);
Rainer Bausenhart, Senden (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/412,925

(22) Filed: Mar. 6, 2012

(65) Prior Publication Data

US 2012/0235390 A1    Sep. 20, 2012

(30) Foreign Application Priority Data

Mar. 15, 2011    (DE) .......................... 10 2011 005 549

(51) Int. Cl.
*B60R 21/213*    (2011.01)

(52) U.S. Cl.
USPC ...................................................... 280/730.2

(58) Field of Classification Search
USPC ...................................................... 280/730.2
See application file for complete search history.

(56) References Cited

U.S. PATENT DOCUMENTS

| | | | |
|---|---|---|---|
| 6,338,498 B1 * | 1/2002 | Niederman et al. ....... | 280/728.2 |
| 6,394,487 B1 | 5/2002 | Heudorfer et al. | |
| 6,481,743 B1 * | 11/2002 | Tobe et al. ................ | 280/728.2 |
| 6,626,456 B2 * | 9/2003 | Terbu et al. ............... | 280/728.2 |
| 6,843,502 B2 * | 1/2005 | Aoki et al. ................. | 280/730.2 |
| 6,877,769 B2 * | 4/2005 | Kim et al. .................. | 280/730.2 |
| 7,025,375 B2 * | 4/2006 | Drossler et al. ............. | 280/729 |
| 7,125,039 B2 * | 10/2006 | Bossecker et al. ......... | 280/730.2 |
| 7,159,895 B2 * | 1/2007 | Aoki et al. ................. | 280/730.2 |
| 7,213,835 B2 * | 5/2007 | Totsuka et al. ............. | 280/730.2 |
| 7,350,804 B2 * | 4/2008 | Bakhsh et al. ............. | 280/730.2 |
| 7,407,182 B2 * | 8/2008 | Aoki et al. ................. | 280/730.2 |
| 7,568,725 B2 * | 8/2009 | Komiyama ................ | 280/730.2 |
| 7,618,057 B2 * | 11/2009 | Pinsenschaum et al. .. | 280/730.2 |
| 7,775,553 B2 * | 8/2010 | Takemura et al. ......... | 280/730.2 |
| 7,815,217 B2 * | 10/2010 | Nakao et al. .............. | 280/730.2 |
| 7,922,192 B2 * | 4/2011 | Fukuda et al. ............. | 280/730.2 |
| 7,942,444 B2 * | 5/2011 | Steinbach et al. ......... | 280/743.2 |
| 7,971,899 B2 * | 7/2011 | Abney et al. .............. | 280/730.2 |
| 8,025,309 B2 * | 9/2011 | Steinbach et al. ......... | 280/730.2 |
| 8,047,566 B2 * | 11/2011 | Abney et al. .............. | 280/730.2 |
| 8,136,838 B2 * | 3/2012 | Villarreal et al. .......... | 280/743.2 |
| 8,141,899 B2 * | 3/2012 | Arima et al. .............. | 280/730.2 |
| 8,186,710 B2 * | 5/2012 | Cheal et al. ............... | 280/730.2 |
| 8,235,418 B2 * | 8/2012 | Slaats et al. ............... | 280/743.2 |

(Continued)

FOREIGN PATENT DOCUMENTS

DE    200 06 927 U1    10/2000
DE    199 56 710 A1    6/2001

(Continued)

*Primary Examiner* — Nicole Verley
(74) *Attorney, Agent, or Firm* — Foley & Lardner LLP

(57) ABSTRACT

A side air bag for a vehicle occupant restraint system of a motor vehicle is provided. The side air bag comprising at least one inflatable chamber, having a first area to protect the head of a vehicle occupant as well as a second area which—referring to the state of the side air bag (in which it is installed in the vehicle and inflated—extends in the direction of the vehicle floor beyond a door parapet which is adjacent to a side window of the vehicle. The chamber is designed in such a way that it tapers off from the first towards the second area.

17 Claims, 2 Drawing Sheets

(56) References Cited

U.S. PATENT DOCUMENTS

| | | | |
|---|---|---|---|
| 8,282,124 B2* | 10/2012 | Trovato et al. | 280/730.2 |
| 8,366,144 B2* | 2/2013 | Fink et al. | 280/730.2 |
| 2001/0030415 A1 | 10/2001 | Acker et al. | |
| 2001/0033073 A1* | 10/2001 | Hammond et al. | 280/730.2 |
| 2002/0101066 A1* | 8/2002 | Tanase et al. | 280/730.2 |
| 2005/0134025 A1* | 6/2005 | Ridella et al. | 280/730.2 |
| 2005/0189743 A1* | 9/2005 | Bakhsh et al. | 280/730.2 |
| 2006/0091662 A1* | 5/2006 | Tsujimoto et al. | 280/743.1 |
| 2006/0125213 A1* | 6/2006 | Kruse | 280/730.2 |
| 2006/0138760 A1* | 6/2006 | Jang | 280/742 |
| 2006/0157958 A1 | 7/2006 | Heudorfer et al. | |
| 2007/0164543 A1* | 7/2007 | Fukuda et al. | 280/729 |
| 2009/0184500 A1* | 7/2009 | Feller et al. | 280/730.2 |
| 2011/0012328 A1* | 1/2011 | Ewing et al. | 280/730.2 |
| 2011/0127755 A1* | 6/2011 | Beppu et al. | 280/730.2 |
| 2012/0104735 A1* | 5/2012 | Abney et al. | 280/730.2 |
| 2012/0119476 A1* | 5/2012 | Saiki et al. | 280/730.2 |
| 2012/0139215 A1* | 6/2012 | Heuschmid et al. | 280/730.2 |
| 2012/0200069 A1* | 8/2012 | Kato et al. | 280/730.2 |

FOREIGN PATENT DOCUMENTS

| | | |
|---|---|---|
| DE | 10 2005 002 085 A1 | 10/2005 |
| DE | 20 2006 010 878 U1 | 10/2006 |
| DE | 10 2005 050 574 A1 | 6/2007 |
| DE | 10 2010 062 422 A1 | 5/2011 |
| GB | 2 393 154 A | 3/2004 |

* cited by examiner

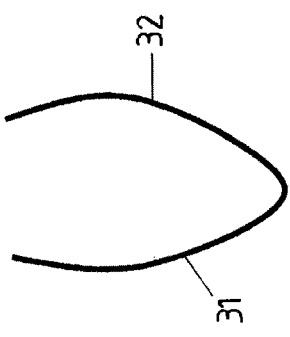
FIG 2
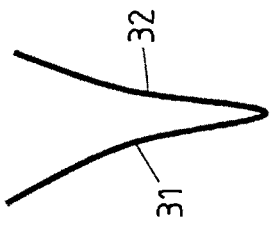
FIG 3A
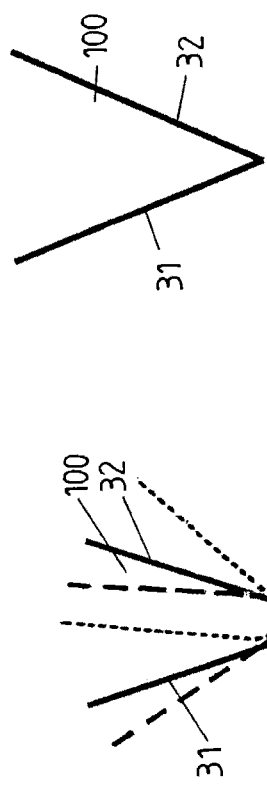
FIG 3B
FIG 3C
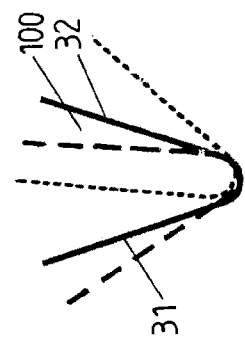
FIG 3D
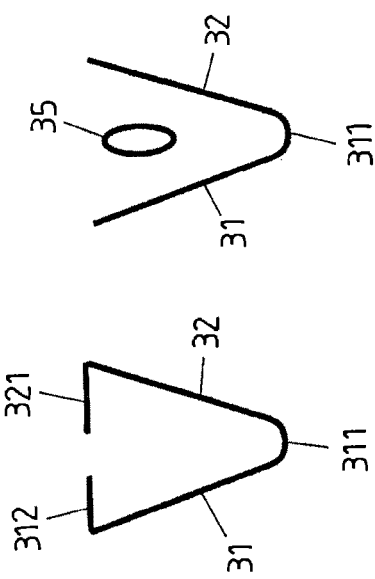
FIG 3H
FIG 3G
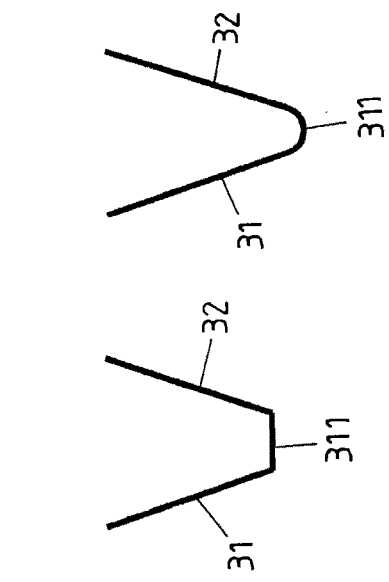
FIG 3F
FIG 3E

SIDE AIRBAG FOR A VEHICLE OCCUPANT RESTRAINT SYSTEM OF A MOTOR VEHICLE

CROSS-REFERENCE TO RELATED APPLICATION

This application claims the benefit of the German Patent Application No. 10 2011 005 549.5-56 filed Mar. 15, 2011, the disclosure of which is fully incorporated herein by reference.

BACKGROUND

The invention relates to a side air bag for a vehicle occupant restraint system of a motor vehicle.

From prior art side air bags are known, which after unfolding extend along a vehicle side structure and particularly serve to protect the head of a vehicle occupant or of multiple vehicle occupants. For example, DE 199 56 710 A1 discloses such a side air bag ("curtain air bag").

SUMMARY

The problem to be solved by the present invention consists in developing a side air bag, which over a time period as long as possible after its activation prevents a vehicle occupant from moving out of the vehicle as well as possible.

According to an exemplary embodiment of the invention a side air bag for a vehicle occupant restraint system of a motor vehicle is provided, having at least one inflatable chamber, having a first area to protect the head of a vehicle occupant as well as a second area which extends—referring to the state of the side air bag in which it is installed in the vehicle and inflated—in the direction of the vehicle floor beyond a door parapet which is adjacent to a side window of the vehicle, wherein the chamber is designed in such a way that it tapers off from the first towards the second area.

As the chamber tapers off from the first area (i.e. its protection area) up to the second area (the overlap area), the chamber indeed has in the protection area a volume as great as possible (i.e. an effective thickness as great as possible in vehicle cross direction), to obtain a protection effect as good as possible. At the same time, particularly also a resistance to kinking of the chamber as high as possible is realised, so that a kinking of the chamber after the air bag has unfolded is counteracted. The chamber has, however, in the overlap area a smaller volume, so that in spite of the relatively great volume of the protection area a filling of the chamber as fast as possible is ensured in case of activation.

In particular, the chamber has longitudinally to the main direction of extension of the side air bag (referring to the state of the non-inflated side air bag in which it is spread out flat) and thus in vehicle longitudinal direction, when viewing the state of the side air bag in which it is installed in the vehicle and inflated, an extension, which gets continuously smaller from the first area towards the second area of the chamber. In other words, the extension of the chamber in vehicle longitudinal direction from the protection area towards the overlap area is only getting smaller (i.e. the extension decreases monotonically). For example, the chamber can be designed in such a way that it—in the inflated state and viewed from the vehicle interior or in top view of the flatly spread-out side air bag—has a V-shaped (carrot-shaped) contour, which opens towards the vehicle roof. In particular, the overlap area of the chamber also tapers off, so that the chamber tapers off beyond the overlap area up to a lower edge section of the side air bag.

It is pointed out that the "main direction of extension" of the side air bag is understood to be that direction, in which the side air bag, in the state in which it is spread out flat or inflated, possesses its greatest extension. In particular, the side air bag according to the invention is a curtain air bag, which in the inflated state extends with its main direction of extension along the vehicle longitudinal direction.

For example, the chamber is confined by a first and a second seam, which run towards each other from the first towards the second area, for example at an angle of 10° to approximately 90°.

The first and the second seam are particularly formed in the form of a sewing seam or a bond seam, wherein in an embodiment of the first and/or the second seam as sewing seam said seam can also be sealed, e.g. with a silicone seal. Additionally, the air bag can also be constructed at least partially sealed, i.e. at least partially consist of sealed or sealing material layers.

The first and the second seam each particularly with a section respectively also confine the first area of the chamber, serving to protect the head of the vehicle occupant, wherein the sections of the first and the second seam, which confine the first area, are oriented differently referring to the direction of the vehicle height (or referring to the main direction of extension of the flatly spread-out air bag), e.g. run diagonal to each other (particularly in the direction of the second area of the side air bag towards each other). For example, the sections of the first and/or the second seam, which confine the first area of the air bag, run at least approximatively straight. It is, of course, also conceivable that the first and/or the second seam runs at least approximatively straight its entire length. Equally, it is conceivable that the first and/or the second seam runs straight only partially and another area of the seam has e.g. a curvature or multiple curvatures, which can e.g. be realised in the shape of a circular arc or multiple circular arcs. It is e.g. also possible that one of the two seams runs straight throughout and the other runs at least partially curved.

The first and the second seam extend particularly into the second area of the air bag and meet there. For example, the first and the second seam essentially extend straight and meet at an acute angle. It is, however, also conceivable that the first and the second seam do not meet at an acute angle, but instead e.g. via a straight section, which runs diagonally to the first and the second seam or via a curved section, wherein the straight or the curved section are formed by the first or the second seam. In particular, the straight section, via which the first and the second seam meet, runs parallel to the main direction of extension of the flatly spread-out air bag, so that the chamber in top view has a V-shaped contour, which—referring to the state of the side air bag in which it is installed in the vehicle—in an edge section of the chamber turned away from the vehicle roof runs flat or curved.

According to another exemplary embodiment of the invention the side air bag has two further chambers, which—referring to the state of the side air bag in which it is installed in the vehicle and inflated—are adjacent to the tapering chamber on the sides of said chamber which are lying opposite each other along the vehicle longitudinal direction. In other words, the tapering chamber is located between the further chambers, at least one of which can likewise have a section, which overlaps with the door parapet. It is obviously also possible that the air bag has more than two further chambers.

The tapering chamber can particularly be designed in such a way that it extends beyond a front side window of the vehicle in the state of the side air bag in which said side air bag is installed in the vehicle. It is, however, also conceivable that the chamber is arranged in the rear area of the side air bag, so that, in the inflated state of the side air bag, it extends beyond a rear side window of the vehicle. Additionally, it is conceivable that the side air bag has multiple tapering chambers with a first area (i.e. a head protection area) and a second area (i.e. an overlap area). For example, such a chamber is located in the rear area of the side air bag to cover a rear side window of the vehicle, and a further one is located in the front area of the side air bag to protect a vehicle occupant from an impact onto the front side window.

Additionally, the side air bag can have a front link section, which—referring to the state of the side air bag in which it is installed in the vehicle—is fixed via a front strap onto a front area of the vehicle body, as well as a rear link section, which is fixed via a rear strap onto a rear area of the vehicle body, wherein a line through the two link sections defines a brace line of the side air bag, and the first area of the side air bag (in the inflated state) extends at least in sections on a side of said brace line (i.e. above) facing the vehicle roof. For example, the first area extends entirely or at least predominantly above the brace line.

According to another exemplary embodiment of the invention the tapering chamber appertains to an inflatable volume of the air bag, which covers a side window (either front or rear) of the vehicle. In particular, the side air bag according to the invention has a first inflatable volume to cover the rear side window and a second inflatable volume to cover the front side window, wherein the tapering chamber can be part of the first or the second inflatable volume. It is also conceivable that both the rear area of the air bag (the rear inflatable volume) and the front area of the air bag (the front inflatable volume) have a tapering chamber, as already indicated further above.

The first area of the chamber has particularly an extension along the main direction of extension of the side air bag (i.e. referring to the state of the side air bag in which it is installed in the vehicle along the vehicle longitudinal direction), which amounts to at least a third of the extension of the inflatable volume, to which the chamber appertains. Additionally, the extension of the chamber longitudinally to the vehicle longitudinal direction amounts to e.g. at least a quarter or at least a third of the width in vehicle longitudinal direction of the side window, which the chamber is allocated to. The "extension" of the chamber is particularly understood to be an extension between two edge points (particularly points of the seams confining the chamber) lying opposite each other along the vehicle longitudinal direction, which lie at the same height (referring to the direction of the vehicle height), wherein particularly the respectively greatest of such extensions, which the chamber has, is viewed.

As mentioned, the side air bag can apart from the chamber tapering off downwards (i.e. towards the overlap area) have further chambers, wherein e.g. the respective (front or rear) inflatable volume of the side air bag is formed by these chambers. Correspondingly, the above-mentioned feature, according to which the chamber has an extension along the main direction of extension of the side air bag, which amounts to at least a third of the extension of the inflatable volume, refers to the total extension of the inflatable volume formed by the plurality of the inflatable chambers.

In particular, it is also conceivable that the inflatable volume, which in the inflated state of the side air bag covers a front or rear side window of the vehicle, is formed by the tapering chamber and further inflatable chambers, wherein the tapering chamber has an extension along the main direction of extension of the side air bag, which is greater than the extension of each of all the further chambers of the inflatable volume. In other words, the tapering chamber is the widest chamber of the inflatable volume or also of the entire side air bag. For example, the tapering chamber possesses a greatest extension (measured between two edge points, which are located at the same height) along the main direction of extension of the side air bag, which amounts to at least 1.3 times the respective greatest extension of all the other chambers.

In particular, the tapering chamber is arranged between two of the further chambers of the inflatable volume and positioned in such a way that upon a side impact the vehicle occupant will impact with his head predominantly or exclusively onto the tapering chamber.

The tapering chamber is according to another exemplary embodiment of the invention—referring to the state of the side air bag in which it is installed in the vehicle and inflated—oriented in such a way that its main direction of extension runs diagonal to the direction of the vehicle height (or diagonal to the main direction of extension of the air bag, when viewing the state of the non-installed air bag in which it is spread out flat). Of course, it is also conceivable that the tapering chamber is oriented in such a way that its main direction of extension essentially runs in the direction of the vehicle height.

BRIEF DESCRIPTION OF THE DRAWINGS

The invention will subsequently be further explained with the help of exemplary embodiments with reference to the figures.

FIG. 2 schematically shows possible alignments of the tapering chamber of the air bag according to the invention, FIGS. 3A-3H show possible contours of the tapering chamber of the side air bag according to the invention.

DETAILED DESCRIPTION

Figure 1:
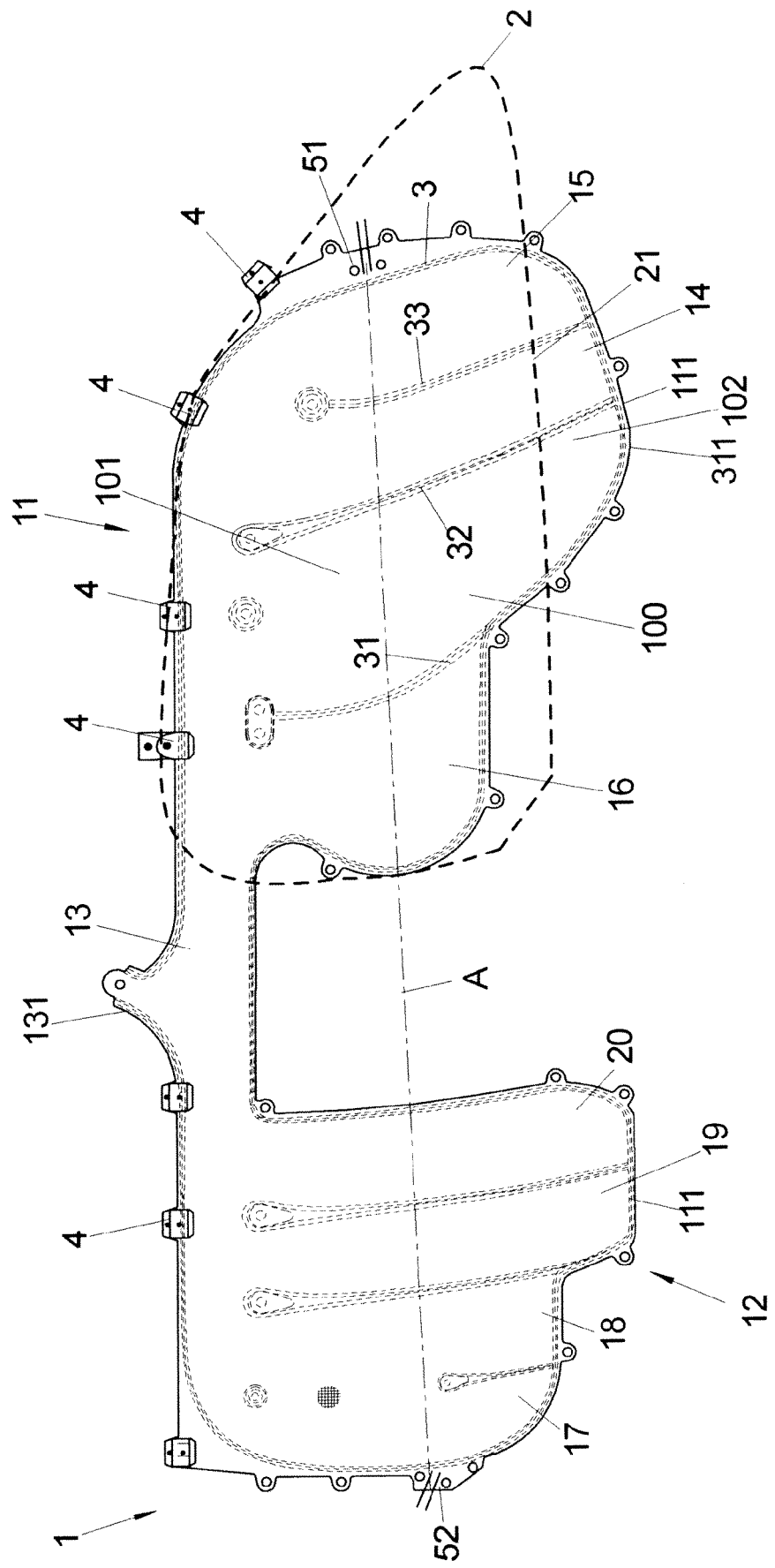
FIG. 1 shows a top view of an air bag according to an exemplary embodiment of the invention.

The side air bag 1 according to the invention illustrated in FIG. 1 has a front inflatable volume 11, which in the illustrated inflated state of the side air bag extends beyond a front window opening 2 (indicated by a dashed contour line) of a vehicle side structure, wherein the front inflatable volume 11 not necessarily has to cover the entire window opening 2. Furthermore, the side air bag 1 has a rear inflatable volume 12, which after activating the side air bag extends beyond a rear window opening with a rear side window (not illustrated).

The front and the rear inflatable volume 11, 12 stand in flow connection with each other via a hose-like connection section 13. In the area of the connection section 13 a projection 131 is located, into which a gas generator or a gas conduit tube to channel gas into the side air bag can be inserted and/or fastened. It is also conceivable that the side air bag instead of the hose-like connection section 13 possesses one (or multiple) chambers or a non-inflatable section, which essentially extend beyond the same height of the vehicle side structure as the front or the rear inflatable volume 11, 12.

The side air bag is fastened to the vehicle body via fastening flaps 4, which are arranged on an upper edge section (facing the roof beam of the vehicle) and a curved front edge section of the air bag. Via the front fastening flaps, arranged on the curved edge section, particularly a linking of the air bag onto the A-pillar of the vehicle takes place.

The front inflatable volume 11 has a chamber 100, which possesses a first area 101 (protection area), serving to protect the head of a vehicle occupant, as well as a second area 102

(overlap area), which extends underneath (referring to the direction of the vehicle height) the first area 101 and protrudes beyond a door parapet section 21 of the window opening 2 to allow for a stabilization of the air bag as good as possible after its activation, so that particularly the vehicle occupant moving out through the window opening is counteracted.

The chamber 100 is designed in such a way that it tapers off from the head protection area 101 towards the overlap area 102. In particular, the chamber 100 has in its protection area 101 also a greater thickness, i.e. an extension in vehicle cross direction, than in the overlap area 102.

The chamber 100 is moreover formed in such a way that it predominantly extends above a brace line A, i.e. on a side facing the roof beam of the vehicle. The brace line A is an (imaginary) line, which runs through a front link area 51 of the side air bag 1, via which the side air bag is fixed by means of a front strap onto a front section of the vehicle body, and through a rear link area 52, via which the side air bag 1 is fixed by means of a rear strap onto a rear section of the vehicle body.

Viewed in vehicle forward direction, two further chambers 14, 15 extend in front of the chamber 100, which is tapering off downwards, which each likewise have a lower area respectively, with which they protrude beyond the door parapet 21. However, these chambers do not essentially taper off downwards. Furthermore, the front inflatable volume 11 has a chamber 16, which is located behind the tapering chamber 100 when viewed in forward driving direction. This chamber 16 essentially extends at the height of the protection area 101 of the chamber 100, however, it is (viewed in direction of the vehicle height) considerably shorter than the chamber 100, wherein it only extends up to a height above the door parapet 21, i.e. a lower edge of the chamber 16 is located at a distance to the door parapet 21 (above the door parapet).

The chambers 100, 14-16 are each confined by seams respectively, wherein the tapering chamber 100 is formed by a first and a second seam 31, 32. The two seams 31, 32 run towards each other towards the overlap section 102 (and up to a lower edge section 111 of the side air bag 1, which is turned away from a roof beam of the vehicle), wherein the first seam 31 runs slightly curved particularly in its upper area and has a lower section 311, running essentially parallel to the main direction of extension of the air bag, via which it meets the second seam 32.

The lower section 311 of the seam 31 is formed as part of a circumferential seam 3 of the side air bag 1, via which at least two air bag layers (i.e. layers of an air bag material, particularly of a textile material) are connected to each other. But the second seam 32 runs essentially straight, wherein it has in its upper area a section which is formed loop-shaped.

The chamber 100, which is defined by the seams 31, 32 thus—viewed from the vehicle interior—has an essentially V-shaped contour, wherein the legs of the V are defined by the seams 31, 32.

The main direction of extension of the chamber 100, i.e. the direction, in which the chamber possesses its greatest extension, runs slightly inclined towards the direction of the vehicle height (in the direction of the rear inflatable volume 12), wherein the "main direction of extension" of the chamber 100 is essentially determined by the course of the straight seam 32.

It is conceivable that also the rear inflatable volume 12 has a tapering chamber of the kind of chamber 100 or that only the rear inflatable volume 12 of the air bag possesses such a chamber.

The protection area 101 of the tapering chamber 100 is wider than the other chambers 14 to 16 of the front inflatable volume 11. This means e.g. that the greatest extension of the chamber 100 along the vehicle longitudinal direction (measured between two points of the seams 31, 32, which are located at the same height) is greater than the greatest extension in vehicle longitudinal direction of each of the chambers 14-16 (and also greater than the extension of chambers 17-20, which form the rear inflatable volume 12).

Additionally, the tapering chamber 100 can be designed in such a way that its greatest extension in vehicle longitudinal direction amounts to at least a third of the extension of the inflatable volume 11 in vehicle longitudinal direction. The chamber 100 thus covers a greater area of the window opening 2 than each of the other chambers 14 to 16.

Furthermore, the chamber 100 also extends further upwards than the front chambers 14, 15, i.e. the seams 31, 32 begin above a seam 33, which confines the chambers 14, 15. For example, the chamber 100 extends beyond at least two thirds of the total height of the inflated side air bag 1 and covers particularly also at least two thirds of the height of the allocated side window (i.e. the window opening 2).

FIG. 2 schematically shows the possibilities for aligning the protection chamber 100 from FIG. 1, wherein the protection chamber 100 is assumed to be one which is defined by two seams 31, 32 running straight, which meet via a curved connection area (e.g. are connected to each other). The chamber can be inclined referring to the direction of the vehicle height, which is illustrated by the alternative contours of chamber 100 indicated with a dashed line.

As already mentioned further above, it is not imperative, that the protection chamber 100 in top view of the flatly spread-out air bag or in top view of the inflated air bag from the vehicle interior possesses an exact V-shape. Rather, it is also conceivable that the chamber indeed possesses an essentially V-shaped design, the legs of the V, however, are not or at least not exclusively designed straight. For example, the legs (i.e. the seams 31, 32 defining the chamber) can at least in sections be curved convexly and/or concavely, as shown e.g. in the FIGS. 3B to 3D. Furthermore, it is conceivable that the seams 31, 32 indeed each run straight, but do not, however, as shown in FIG. 3A, meet at an acute angle, but instead meet via a section 311 of one of the two seams 31, 32, which said section 311 is running flat or curved (FIGS. 3E and 3F).

Furthermore, it is also conceivable that the chamber 100 has towards the top an inflow area with a reduced inflow cross section, which is formed particularly by areas 312, 321 of the seams 31, 32 which are oriented diagonally to the sections of the seams 31, 32, which (referring to the vehicle longitudinal direction) confine the chamber laterally (FIG. 3G). Furthermore, is conceivable, that in the area of the inflatable volume of the chamber 100 at least one (e.g. circular) dart 35 is arranged (FIG. 3H), wherein the effective thickness of the chamber 100, i.e. the thickness of the chamber in vehicle cross direction, is reduced (e.g. to zero) in the area of the dart.

Of course, the opportunities for the design of the chamber 100 shown in the FIGS. 3A to 3H can also be used in combination with each other, so e.g. a dart (according to dart 35 in FIG. 3H) can also be used in the remaining exemplary embodiments of the chamber 100.

The invention claimed is:
1. A side air bag for a vehicle occupant restraint system of a motor vehicle, comprising
at least one inflatable chamber, having a first area to protect the head of a vehicle occupant as well as a second area which extends—referring to the state of the side air bag in which it is installed in the vehicle and inflated—in the direction of the vehicle floor beyond a door parapet which is adjacent to a side window of the vehicle, wherein the chamber is designed in such a way that it tapers off from the first towards the second area; and a second inflatable chamber adjacent to the first inflatable chamber, wherein the second inflatable chamber—in the direction of the vehicle height—is shorter than the first chamber and only extends down to a height above the door parapet.

2. The side air bag according to claim 1, wherein the extension of the chamber in the vehicle longitudinal direction gets continuously smaller from the first area towards the second area.

3. The side air bag according to claim 1, wherein the chamber—in the inflated state and viewed from the vehicle interior—has at least approximately a V-shaped contour.

4. The side air bag according to claim 1, wherein the chamber is confined by a first and a second seam, which run towards each other from the first towards the second area.

5. The side air bag according to claim 4, wherein the first and the second seam each with a section respectively confine the first area of the chamber, wherein the sections of the first and the second seam, which confine the first area, are orientated differently referring to the direction of the vehicle height.

6. The side air bag according to claim 5, wherein the sections of the first and/or the second seam, which confine the first area of the side air bag, run at least approximatively straight.

7. The side air bag according to claim 4, wherein the first and the second seam meet via a section of the first or the second seam, wherein the section runs straight and diagonal to the first and the second seam or curved.

8. The side air bag according to claim 1, further comprising two further chambers, which—referring to the state of the side air bag in which it is installed in the vehicle and inflated—are adjacent to the tapering chamber on the sides of said chamber which are lying opposite each other along the vehicle longitudinal direction.

9. The side air bag according to claim 1, wherein the chamber—referring to the state of the side air bag in which it is installed in the vehicle and inflated—extends beyond a front side window of the vehicle.

10. The side air bag according to claim 1, further comprising a front link section, which—referring to the state of the side air bag in which it is installed in the vehicle—is fixed onto a front area of the vehicle body, as well as a rear link section, which is fixed onto a rear area of the vehicle body, wherein a line through the two link sections defines a brace line of the side air bag and the first area of the side air bag extends at least in sections on a side of the brace line which is facing the vehicle roof.

11. The side air bag according to claim 1, wherein the chamber appertains to an inflatable volume of the side air bag, which—referring to the state of the side air bag in which it is installed in the vehicle and inflated—at least in part covers a side window of the vehicle, wherein the first area of the chamber, serving to protect the head of the vehicle occupant, has an extension along the main direction of extension of the side air bag, which amounts to at least a third of the extension of the inflatable volume along the main direction of extension of the side air bag.

12. The side air bag according to claim 1, wherein the tapering chamber appertains to an inflatable volume of the side air bag, which—referring to the state of the side air bag in which it is installed in the vehicle and inflated—at least in part covers a side window of the vehicle, wherein the inflatable volume consists of the tapering chamber and further inflatable chambers, and wherein the tapering chamber has a greater volume than any of the further chambers.

13. The side air bag according to claim 1, wherein the tapering chamber appertains to an inflatable volume of the side air bag, which—referring to the state of the side air bag in which it is installed in the vehicle and inflated—at least in part covers a side window of the vehicle, wherein the inflatable volume consists of the tapering chamber and further inflatable chambers, and wherein the tapering chamber has an extension along the main direction of extension of the side air bag, which is greater than the extension of any of the further chambers of the inflatable volume along the main direction of extension of the side air bag.

14. The side air bag according to claim 13, wherein the tapering chamber has a greatest extension along the main direction of extension of the side air bag, which amounts to at least 1.3 times the respective greatest extension of all the other chambers of the inflatable volume.

15. The side air bag according to claim 1, wherein the chamber—referring to the state of the side air bag in which it is installed in the vehicle—is orientated in such a way that its main direction of extension runs diagonal to the direction of the vehicle height.

16. The side air bag according to claim 1, wherein the side air bag has a first inflatable volume to cover the rear side window and a second inflatable volume to cover the front side window, wherein the second area of the chamber extends on a side of the door parapet which is facing the vehicle interior and the tapering chamber is part of the second inflatable volume and tapers off beyond the second area up to a lower edge section of the side air bag.

17. A side air bag for a vehicle occupant restraint system of a motor vehicle, comprising at least one inflatable chamber, having a first area to protect the head of a vehicle occupant as well as a second area which extends—referring to the state of the side air bag in which it is installed in the vehicle and inflated—in the direction of the vehicle floor beyond a door parapet which is adjacent to a side window of the vehicle, wherein the chamber is designed in such a way that it tapers off from the first towards the second area, and a first inflatable volume to cover a rear side window of the motor vehicle and a second inflatable volume to cover a front side window of the motor vehicle, and wherein exclusively the second inflatable volume comprises a chamber that tapers off from a head protecting area towards a second area extending beyond a door parapet.

* * * * *